United States Patent
Kumar

(10) Patent No.: US 7,917,257 B2
(45) Date of Patent: *Mar. 29, 2011

(54) METHOD FOR DETERMINING THE ROTATIONAL VELOCITY OF AN AXLE AND DETECTING A LOCKED AXLE CONDITION

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 2043 days.

This patent is subject to a terminal disclaimer.

(21) Appl. No.: 10/797,297

(22) Filed: Mar. 9, 2004

(65) Prior Publication Data

US 2004/0172176 A1 Sep. 2, 2004

Related U.S. Application Data

(63) Continuation-in-part of application No. 10/066,233, filed on Jan. 31, 2002, now Pat. No. 6,728,606.

(51) Int. Cl.
*G05D 1/00* (2006.01)
*H02P 1/54* (2006.01)
*G01M 19/00* (2006.01)

(52) U.S. Cl. ............ 701/19; 701/82; 318/139; 318/609; 303/151; 73/118.1

(58) Field of Classification Search .................. None
See application file for complete search history.

(56) References Cited

U.S. PATENT DOCUMENTS

| | | | | |
|---|---|---|---|---|
| 5,290,095 A * | 3/1994 | Wood et al. | ........... | 303/133 |
| 5,357,181 A * | 10/1994 | Mutoh et al. | ......... | 318/139 |
| 5,629,567 A * | 5/1997 | Kumar | ........... | 290/3 |
| 5,661,380 A * | 8/1997 | Obara et al. | ......... | 318/139 |
| 5,677,611 A * | 10/1997 | Yoshihara et al. | ........ | 318/803 |
| 5,689,170 A * | 11/1997 | Ishikawa | ......... | 318/811 |
| 5,739,649 A * | 4/1998 | Akao | ......... | 318/139 |
| 5,990,648 A * | 11/1999 | Kumar et al. | ......... | 318/490 |
| 5,992,950 A * | 11/1999 | Kumar et al. | ......... | 303/151 |
| 6,054,827 A * | 4/2000 | Takatsuka et al. | ......... | 318/474 |
| 6,271,637 B1* | 8/2001 | Kushion | ......... | 318/434 |
| 6,326,758 B1* | 12/2001 | Discenzo | ........ | 318/609 |
| 6,728,606 B2* | 4/2004 | Kumar | ........... | 701/19 |
| 6,758,087 B2* | 7/2004 | Balch et al. | ........ | 73/115.08 |
| 2007/0213912 A1* | 9/2007 | Deur et al. | ........... | 701/82 |

OTHER PUBLICATIONS

R.C.Becerra; T.M jahns; M.Ehasani; Four Quadrant Sensorless Brushless ECM Driver; CH2992-6/91/0000-0202; IEEE.*
Three Phase I.*
Three Phase II.*

* cited by examiner

*Primary Examiner* — Khoi Tran
*Assistant Examiner* — Ian Jen
(74) *Attorney, Agent, or Firm* — Cantor Colburn LLP

(57) ABSTRACT

A method for detecting a rotational velocity of a traction motor in a vehicle comprising: obtaining a traction motor signal having at least one phase, wherein the traction motor signal is responsive to an operating condition of the traction motor in an electrically unexcited state. The method also includes processing the traction motor signal to create an indication result based on a frequency of the traction motor signal and determining rotational velocity of the traction motor based on the indication result.

32 Claims, 10 Drawing Sheets

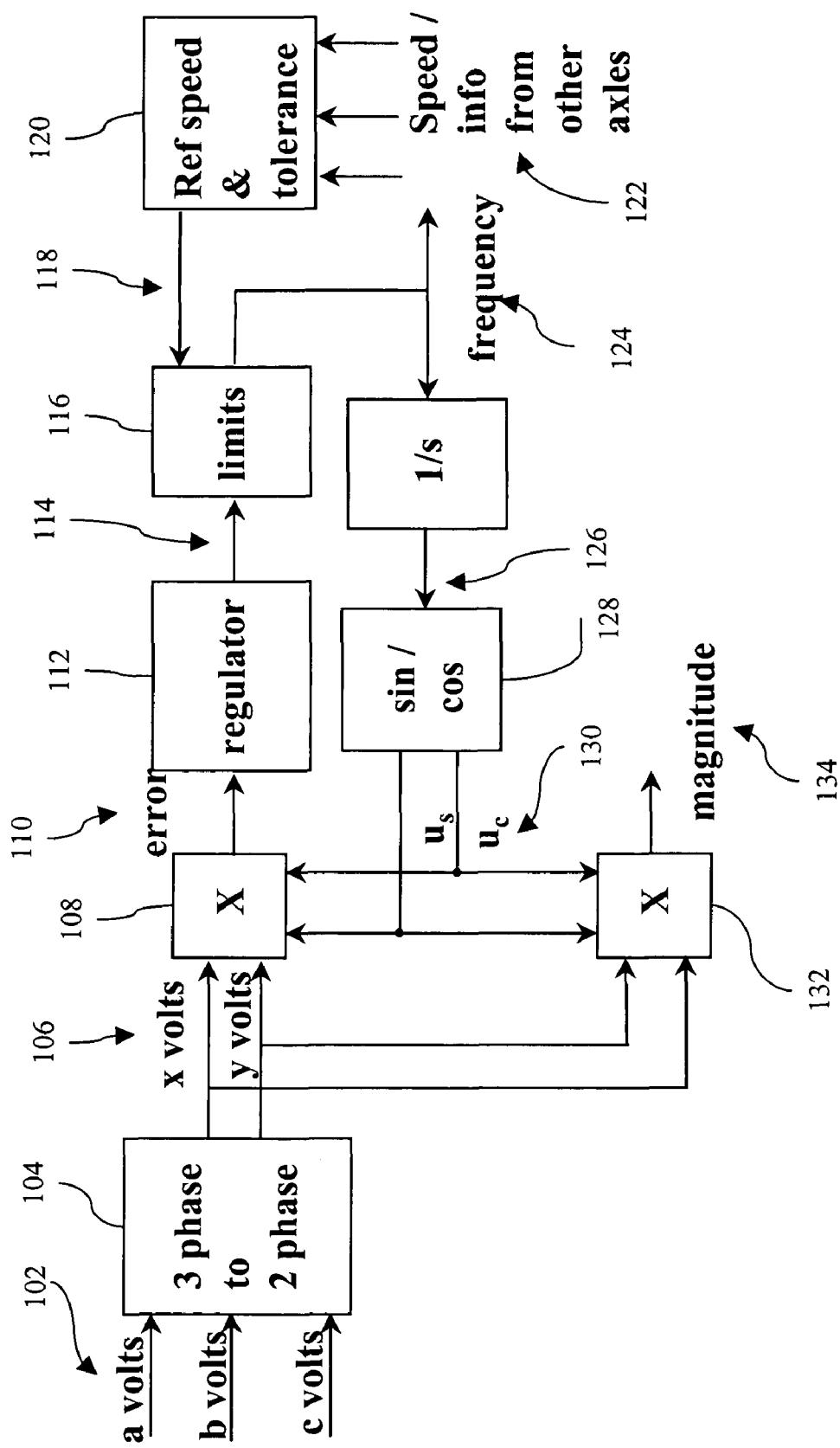
Figure 3a. Phase Locked Loop Frequency and Magnitude Determination

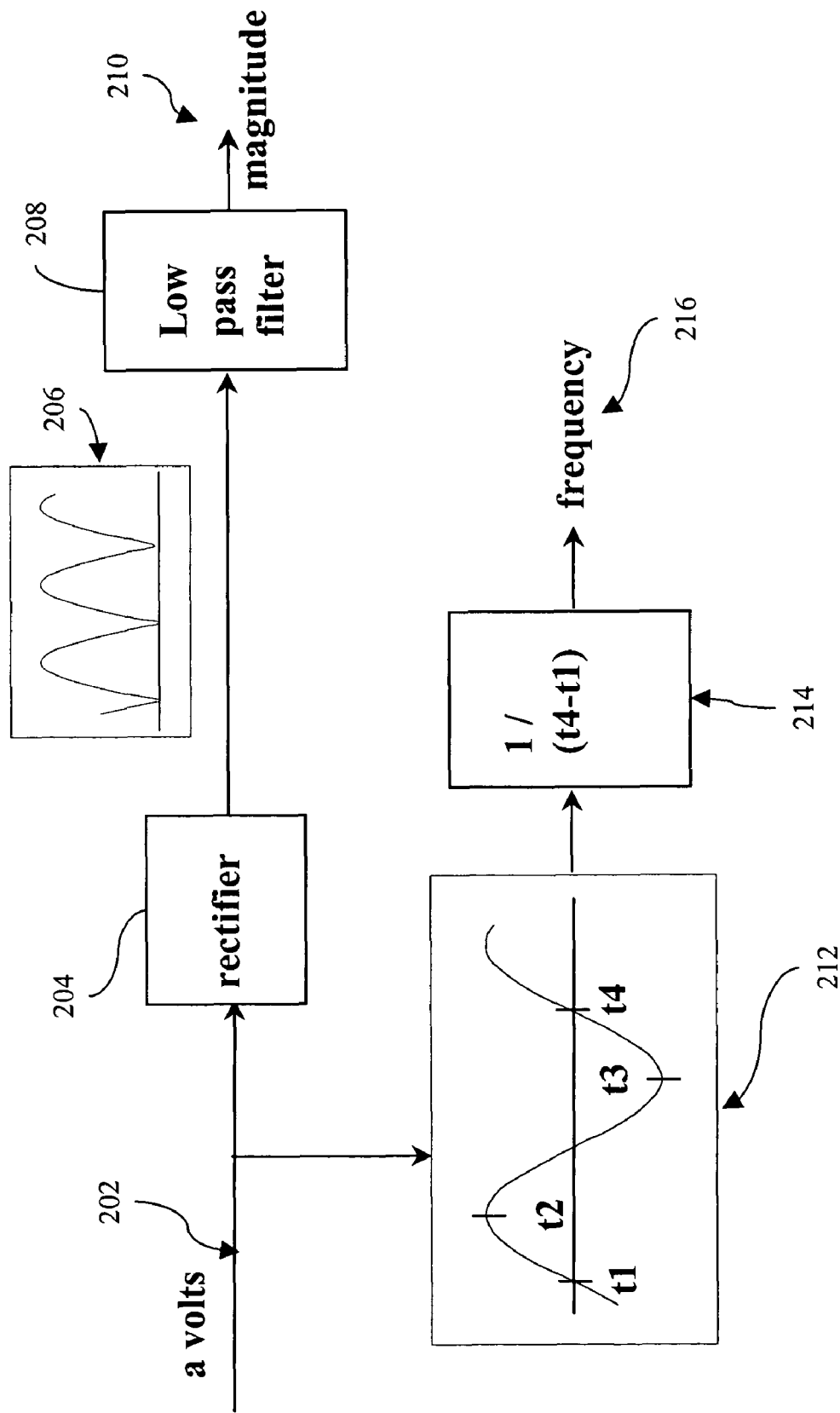
Figure 4a. Time between specified values for frequency determination

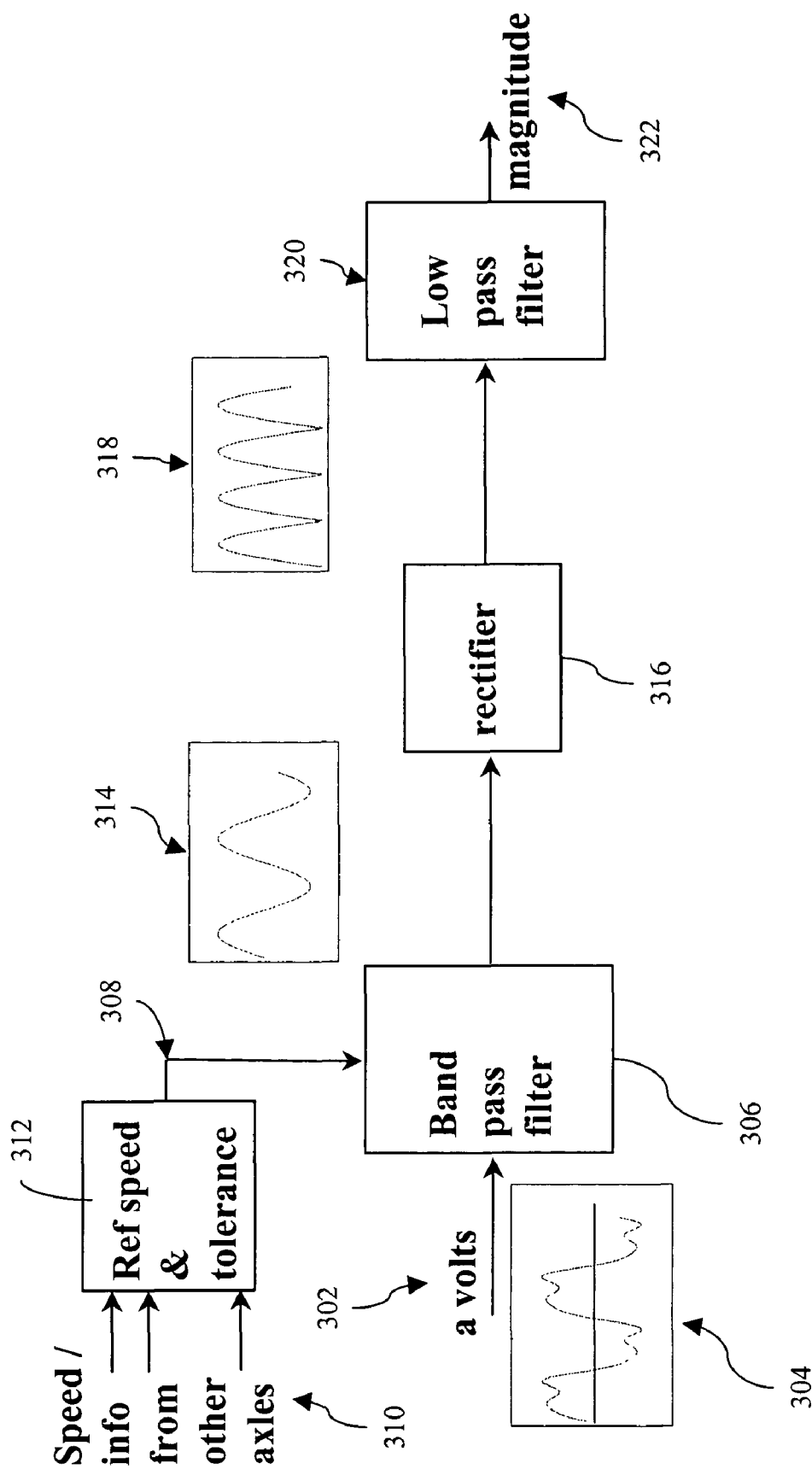
Figure 5a. Band pass filter for magnitude determination

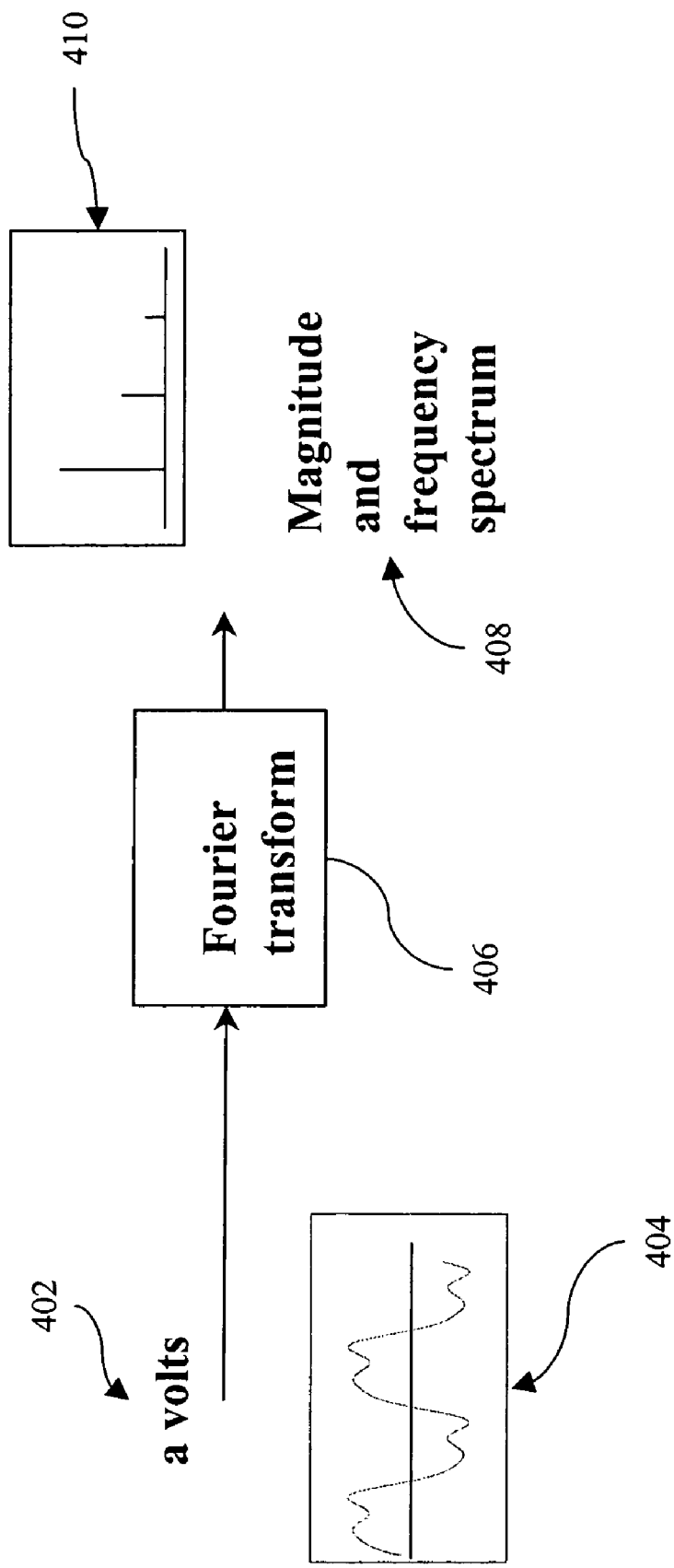
Figure 6a. Fourier Transform for frequency determination

METHOD FOR DETERMINING THE ROTATIONAL VELOCITY OF AN AXLE AND DETECTING A LOCKED AXLE CONDITION

CROSS-REFERENCE TO RELATED APPLICATIONS

This application is a continuation-in-part application of U.S. Ser. No. 10/066,233, filed Jan. 31, 2002 now U.S. Pat. No. 6,728,606 the contents of which are incorporated by reference herein in their entirety.

BACKGROUND OF THE INVENTION

This invention relates generally to a method for determining the rotational velocity of an axle (and in the limiting case of no detected axle speed then to also serve to detect a locked axle condition for a vehicle). More particularly, the invention relates to a method for determining the rotational velocity of an axle and detecting a locked axle condition for an AC locomotive, which is propelled by AC traction motors.

Locomotives used for hauling applications are generally equipped with speed sensors coupled to individual traction motors or to the axles driven by the traction motors. The speed sensor data or speed sensor information is monitored and is used for various function like torque production, speedometer, cruise control etc. It is also used to detect a locked axle condition. If a locked axle condition occurs on a given axle while the locomotive is moving, the respective rotational axle speed will decrease to zero, while the remaining axles will continue to rotate at the speed corresponding to the speed of the locomotive. This locked axle condition will cause the axle wheel to slide along the rail and could adversely affect the handling characteristics of the locomotive. Thus, the speed sensor can usually detect a locked axle condition whenever a substantial difference in speed exists in one axle relative to the remaining axles.

When a locked axle is detected the locomotive operator generally has to stop the locomotive and inspect the axle for any visual damage. If there is no visual damage to the axle, then the locomotive is moved slightly in order to ascertain if the axle is in fact locked or if the detection of the locked axle is a false detection caused by a failure in the speed sensor. Using the current method of detecting a locked axle, when a locked axle condition is detected due to a failure in the speed sensor, the locked axle speed sensor and/or speed detection system is disabled and the locomotive is operated at a lower speed limit until the locked axle speed sensor and/or speed detection system can be repaired.

Unfortunately, this method has a number of disadvantages. One disadvantage is that stopping locomotives, inspecting axles and operating at slower speeds involve burdensome delays and can be expensive. A second disadvantage of this method is that it allows a large amount of electric power to be lost when an axle becomes locked. This is because the traction motor is driven by power supplied to the traction motor by the locomotive. When an axle becomes locked power is still supplied by the locomotive to drive the traction motor and this power becomes lost in the semiconductor devices of the traction motor. A third disadvantage is that if any of the electronic components of the locked axle speed sensor and/or speed detection system fails then locked axle detection is not possible. If the sensors do not function correctly, then a locked axle condition may occur without being detected.

Similarly if the speed sensor connected to the speedometer is not functional, the locomotive may not operational due to potential inability to be operated within the speed limit. Two methods to determine speed and hence locked axle condition of a vehicle having traction motors are known. The first one is a speed sensor, which senses the rotation of the shaft. The second one determines the speed by analyzing the response (for example, current or torque) to an excitation of the motor (for example, voltage). If the speed sensor fails or is not available, the only known method to determine the speed is to excite the motor. In that regard, the source of voltage/power used to excite the traction motors is produced on the locomotive typically by regulating the field of an alternator driven by an engine. There are many operating conditions in a locomotive when this source of voltage is not available like when the engine is not running. Moreover, the application of power to the motor produces losses in the power semiconductor devices and other electrical components, such as the motor and alternator.

More particularly, in the prior art locomotives use traction motors to drive the axles. A speed sensor senses the passing of a tooth gear attached to either the axle shaft or the motor shaft. These speed sensors, while adequate for their intended purposes, can be costly and may experience failures. Therefore, additional speed sensors for redundancy may not be desirable. Locked axle detection also uses the above speed sensor information. Methods of determining locked axle condition when a speed sensor fails are described in U.S. Pat. Nos. 5,990,648 and 6,532,405 also assigned to the assignee of this application. U.S. Pat. No. 5,990,648 describes a technique which can be used for determining locked axle condition when the motor/axle is not producing any useful torque and U.S. Pat. No. 6,532,405 describes a technique which can be used for determining locked axle condition when the motor/axle is producing useful torque (motoring/dynamic braking). In both cases, the traction motor is excited with an AC voltage of known amplitude and frequency. The current response of the motor to this applied voltage and frequency is used to determine the state of the motor.

However there are many operating conditions of a locomotive when an excitation voltage is not available. For example, when the engine is not running, or when the locomotive is in isolated mode such that the alternator cannot produce voltage. Another instance when an excitation voltage is not available is when there is a failure or unavailability of the components used in the production of AC voltage to the motor like inverters and power electronics. Furthermore, a failure in the components used to produce voltage to the inverter like the alternator and its field excitation system or failure in the components attached to the DC traction bus (like dynamic brake grid resistors and contactors or failure in the diesel engine components). During any of these conditions, it will be desirable to know the speed of the motor/axle, as well as detect and verify the existence of a locked axle condition.

Therefore, there is a need for a low-cost method to reliably determine the speed of the motor/axle and to thus determine when a locked axle condition occurs in a vehicle wherein the excitation source is not available or is otherwise not desirable for use and wherein the method does not rely solely on axle speed sensors for locked axle detection.

BRIEF DESCRIPTION OF INVENTION

Disclosed herein in an exemplary embodiment is a method for detecting a rotational velocity of a traction motor in a vehicle comprising: obtaining a traction motor signal having at least one phase, wherein the traction motor signal is responsive to an operating condition of the traction motor in an electrically unexcited state. The method also includes processing the traction motor signal to create an indication result based on a frequency of the traction motor signal and determining rotational velocity of the traction motor based on the indication result.

Also disclosed herein in another exemplary embodiment is a system for detecting a rotational velocity of a traction motor in a vehicle comprising: a traction motor generating a traction motor signal having at least one phase, wherein the traction motor signal is responsive to an operating condition of the traction motor in an electrically unexcited state and a voltage sensor configured to generate a signal indicative a voltage generated by residual flux in the traction motor when rotated by movement of the vehicle with the traction motor in an electrically unexcited state. The system also includes a controller in operable communication with at least one of the traction motor and the voltage sensor configured to process the traction motor signal and the signal, and thereby create an indication result responsive to a frequency of the traction motor signal and indicative of rotational velocity of the traction motor.

Further disclosed herein in yet another exemplary embodiment is a data storage medium including instructions encoded in a computer readable form for causing a computer to implement a process for detecting a rotational velocity of a traction motor in a vehicle.

In yet another exemplary embodiment, disclosed herein is a computer data signal encoded in a computer readable medium, the data signal comprising code configured to direct a computer to implement a process for detecting a rotational velocity of a traction motor in a vehicle.

Also disclosed herein in an exemplary embodiment is a computer processor on a vehicle for performing a process for detecting a rotational velocity of a traction motor in a vehicle comprising: obtaining a traction motor signal having at least one phase, wherein the traction motor signal is responsive to an operating condition of the traction motor in an electrically unexcited state. The process also includes processing the traction motor signal to create an indication result responsive to a frequency of the traction motor signal; and determining rotational velocity of the traction motor based on the indication result.

BRIEF DESCRIPTION OF THE DRAWINGS

The above discussed and other features and advantages will be appreciated and understood by those skilled in the art from the following detailed description and drawings, wherein like elements are designated by like numerals in the several figures.

FIG. 3a is one technique for implementing the method depicted in FIG. 3;

FIG. 4a is one technique for implementing the method depicted in FIG. 4;

FIG. 5a is one technique for implementing the method depicted in FIG. 5;

FIG. 6a is one technique for implementing the method depicted in FIG. 6.

DETAILED DESCRIPTION OF THE INVENTION

It should be noted that although an exemplary embodiment is illustrated hereinafter with regard to a locomotive, it is considered within the scope this embodiment that the method may be applied to any vehicle 1 or device having a motor which produces a back electromotive force (EMF).

When turning, AC traction motors produce a small AC voltage (back EMF or electro motive force) across their terminals due to a residual magnetic flux. The amplitude of this voltage depends on the residual flux in the machine and the residual flux itself depends upon the motor characteristics and its operational history. The frequency of this induced voltage is proportional to the speed of the motor. An exemplary embodiment of the invention makes use of this back EMF voltage produced during non-excited state of the traction motor operation to determine a rotational velocity of the motor and optionally whether a locked axle condition exists. Therefore, a technical effect of an exemplary embodiment is determination of a rotational velocity of the motor during non-excited state.

Figure 1:
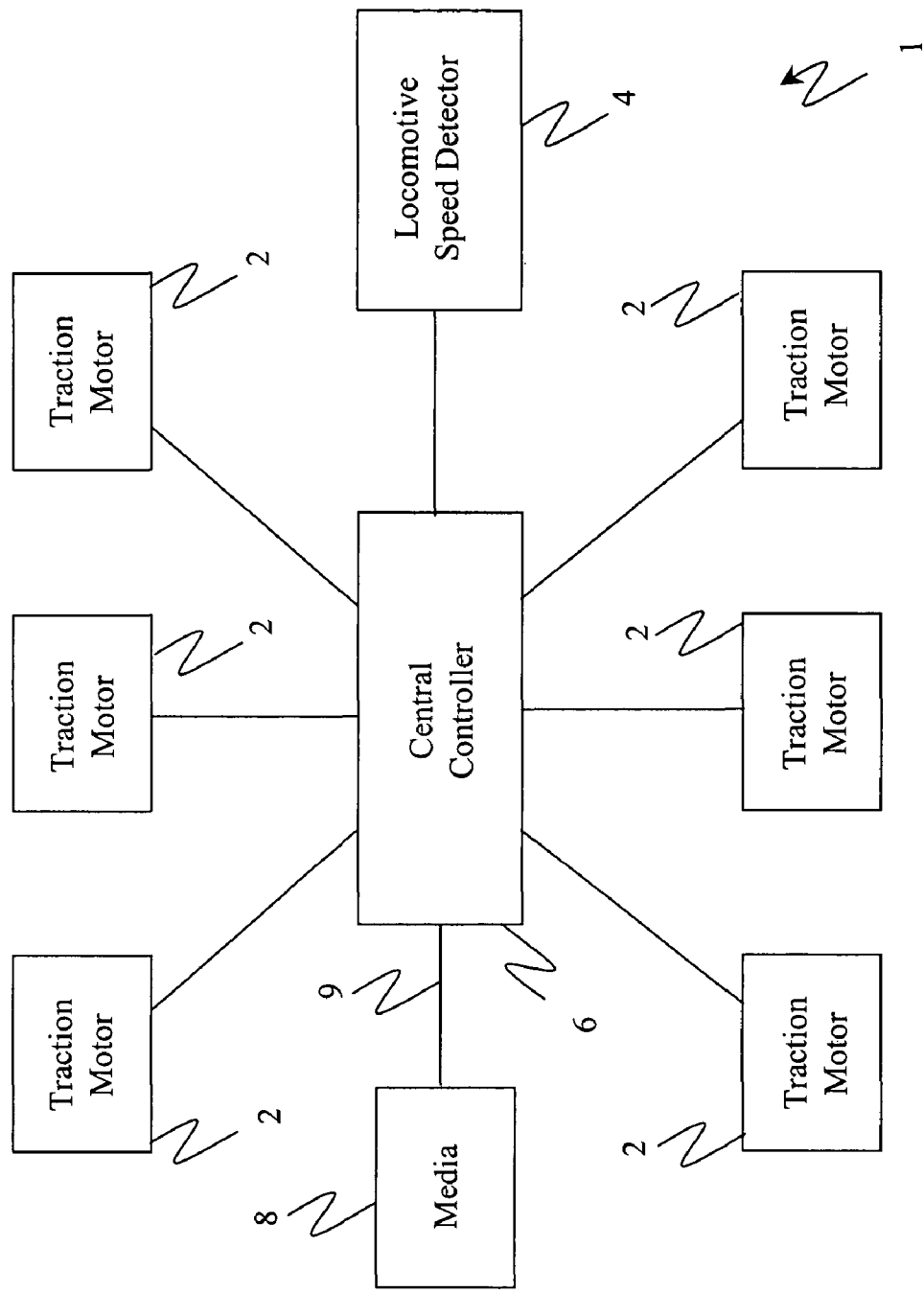
FIG. 1 is an overall system schematic of an AC locomotive in accordance with an exemplary embodiment.
Figure 2:
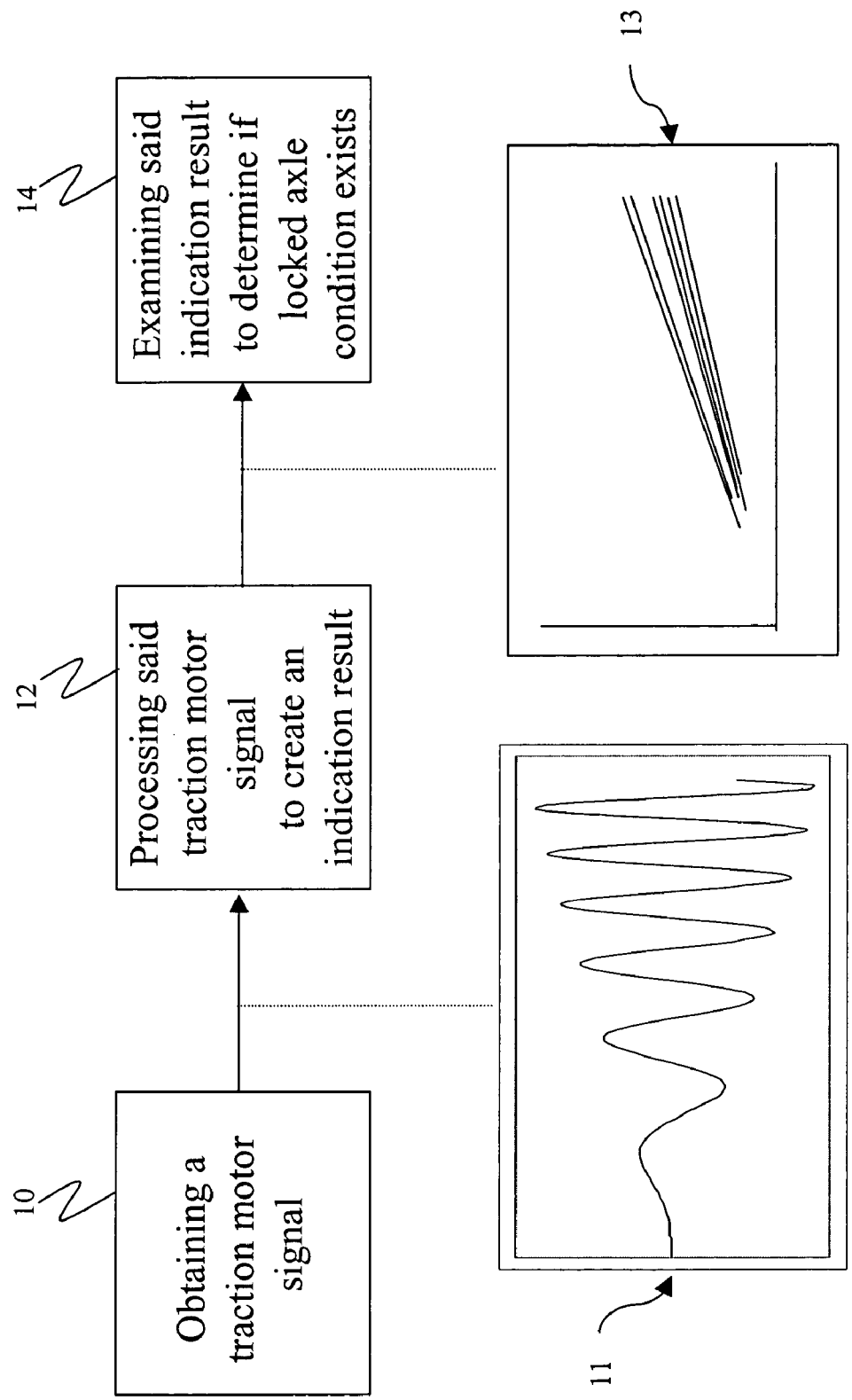
FIG. 2 is a flow diagram describing an overall embodiment of a method for detecting a locked axle condition in a vehicle in accordance with an exemplary embodiment.

Referring to FIGS. 1 and 2, an overall method for detecting a locked axle condition in a vehicle 1 having a traction motor 2, a locomotive speed detector 4 and a central controller 6 is discussed. In accordance with an exemplary embodiment, central controller 6 is preferably communicated with traction motor 2 and locomotive speed detector 4. In accordance with an exemplary embodiment, locomotive speed detector 4 may use speed information from all axles and/or combine speed information for other axles with other sources of speed information, such as RADAR, GPS, axles with functional speed sensors, axles with excitation to obtain the best approximation of the speed at which vehicle 1 is traveling. In this figure, six traction motors 2 are shown for illustration. It is understood that vehicles could have different number of axle/motor combinations also.

Referring to FIG. 2, while vehicle 1 is operating, central controller 6 obtains a traction motor signal from traction motor 2 as shown in step 10, wherein the traction motor signal is preferably responsive to the back EMF of the traction motor 2. An example of the output of 10 is illustrated by waveform 11 in the figure. Waveform 11 is the depiction of one of the motor phase voltages as the vehicle speed is increasing from zero speed. It can be seen that, initially, the amplitude and frequency are low, and as time progresses, (as the vehicle speed increases), the amplitude and frequency of this signal increases. It will also be appreciated that for a multiphase motor, in this instance a three phase motor, the other phases exhibit similar voltages, but shifted by the appropriate angle (120 degrees for a three phase motor). Other motors will produce similar waveforms with possibly different ratio of voltage to frequency depending upon the amount of residual flux in the motor. The frequency will depend on the speed of these motors and are typically close to each other.

The central controller 6 processes the traction motor signal to create an indication result, as shown in step 12. In accordance with an exemplary embodiment, the speed indication result is preferably responsive to the magnitude and/or frequency of the traction motor signal. For the waveform similar to 11, graph 13 in FIG. 2 shows an illustration of the output of this processing. The results and signal processing for a vehicle 1 with six axles/traction motors is shown here. The signal amplitude indicates the frequency of the input waveform 11. Since each motor could run at different speeds (for example, due to wheel diameter differences), the amplitudes of these signals are different. Similarly, since a minimum voltage is required for reliable signal processing, the axle/motor speed at which a speed measurement signal result would be available also varies. If working speed sensors are available then that indication could be used or could be combined with the back EMF speed indication. This speed could be used for various purposes like locked axle indication, speedometer, adhesion control, cruise control, wheel diameter calibration etc. The indication result is then examined to determine if a locked axle condition exists, as in step 14. Therefore, in one or more exemplary embodiments a speed of a motor/axle is determined based on the indication result. In accordance with another exemplary embodiment, although the overall method for detecting a locked axle condition described hereinabove is described as being implemented based on the speed of vehicle 1, it is considered within the scope of the embodiment that the overall method described herein may be implemented for any reason suitable to the desired end purpose.

In accordance with another exemplary embodiment, a locked axle condition is determined to have occurred if the following condition occurs. If either the magnitude and/or the frequency of the indication result for a particular traction motor 2 is either zero or substantially different from the other axles, then it is considered unknown if a locked axle exists and a locked axle condition is assumed to have occurred for that particular axle. However, if both the magnitude and frequency of an indication result for a particular axle are substantially the same as the other axles on vehicle 1, then it is determined that a locked axle condition has not occurred and does not exist for that particular axle.

Figure 3:
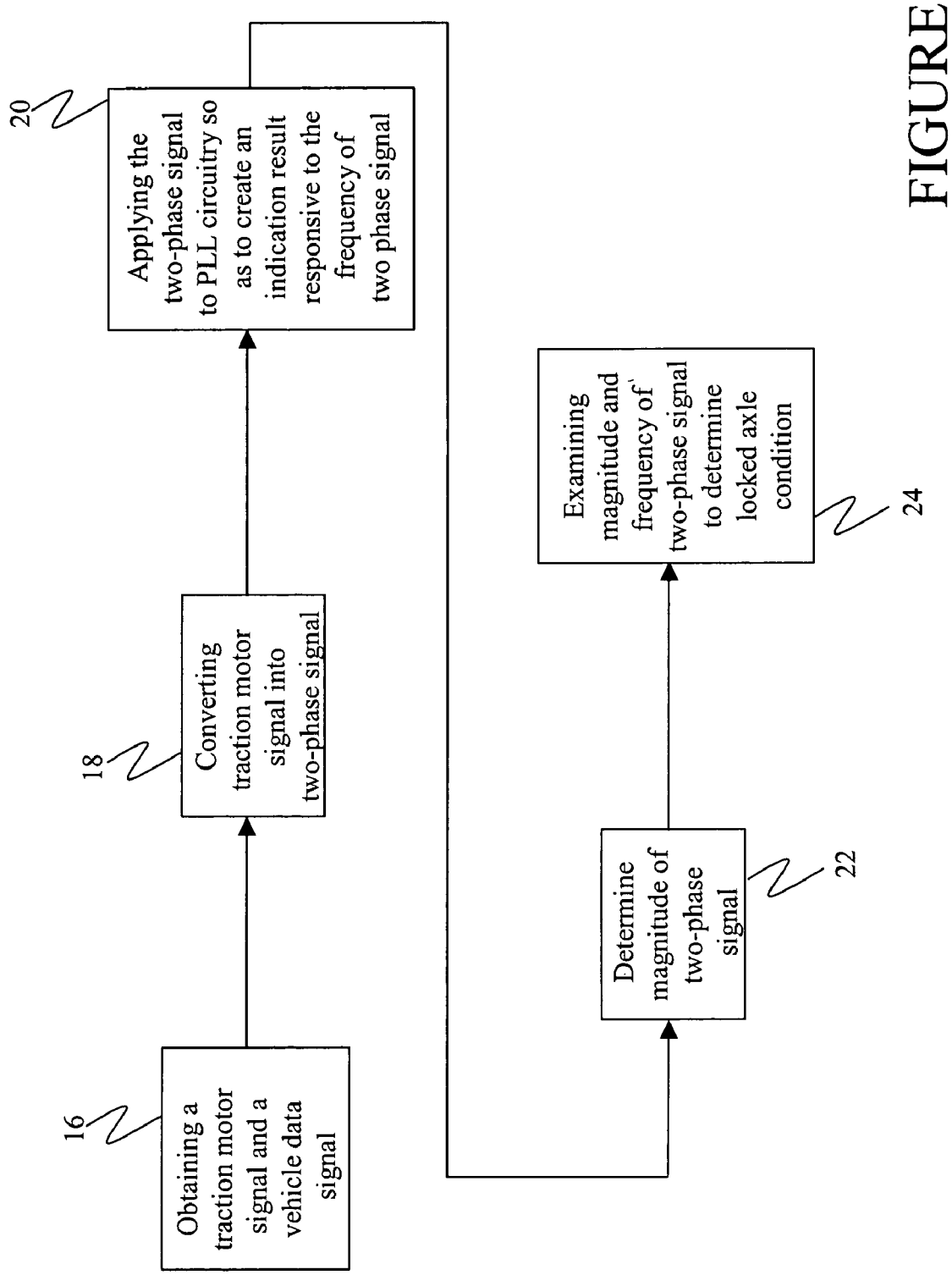
FIG. 3 is a flow diagram describing a first embodiment of a method for detecting a locked axle condition in a vehicle in accordance with an exemplary embodiment.

In accordance with an exemplary embodiment, there are a variety of ways to apply the method as discussed herein. These are discussed as follows. Referring to FIG. 3, a first embodiment is discussed, with FIG. 3a showing details of the determination. In accordance with a first embodiment, a traction motor signal and at least one vehicle data signal are obtained from vehicle 1 as shown in step 16. The traction motor signal is then converted into a two-phase signal as shown in step 18. In accordance with an exemplary embodiment, traction motor signal may be converted into a two-phase signal using any device, circuitry or method known in the art and suitable to the desired end purpose. Also, in accordance with an exemplary embodiment, any balanced three-phase signal may be transformed into a balanced two-phase signal using any available techniques suitable to the desired end purpose.

The two-phase signal derived from the back EMF is then applied to phase locked loop (PLL) circuitry to create an indication result, which is responsive to the frequency of the two-phase signal as in step 20. This may be done by applying the two-phase signal derived from the back EMF to PLL circuitry to create a PLL signal responsive to the frequency of the two-phase signal. This PLL signal is then used to create a two-phase unity signal responsive to the frequency of the PLL signal. The unity signal is then combined with the two-phase signal derived from the back EMF so as to create an indication result responsive to the frequency error of the unity signal and/or the two-phase signal derived from the back EMF. In accordance with an exemplary embodiment, the unity signal may be created using any method suitable to the desired end purpose. Also in accordance with an exemplary embodiment, the unity signal and the two-phase signal derived from the back EMF may be combined using any combination technique or method suitable to the desired end purpose.

In addition, the two-phase signal derived from the back EMF is further examined so as to create an indication result, which is responsive to the magnitude of the two-phase signal as in step 22. This may be done by using the unity signal to resolve the two-phase signal derived from the back EMF to generate an indication result responsive to the magnitude of the two-phase signal derived from the back EMF. The indication result that is responsive to the magnitude of the two-phase signal derived from the back EMF and the indication result that is responsive to the frequency of the unity signal and/or the two-phase signal derived from the back EMF are then examined, as in step 24, so as to determine if a locked axle condition exists. If a steady magnitude exists then the frequency generated by the PLL circuitry corresponds to the frequency of the back EMF, which is proportional to the speed of traction motor 2. If the magnitude of the back EMF voltage is low, then the frequency calculation may not be accurate and could be set to zero. The very low voltage signal could be due to noise in the system or measurement. If the magnitude of the signal is not low, then the frequency indicates the speed of the motor. Therefore, if the determined frequency is substantially lower than the speed of vehicle 1, then a locked axle is indicated. If the magnitude of the signal is not steady then the determined frequency may be in error (for example, due to noise) and a possible locked axle condition is assumed.

FIG. 3a shows details of one technique for phase lock loop implementation. A three phase to two-phase converter 104 converts the traction motor voltage signals 102 to a two-phase signal 106. A three-phase traction motor signal is shown for illustration. These signals are typically balanced sine waves phase shifted 120 degrees apart in time. There are many ways of converting this three-phase signal to a two-phase signal. For example one of the two phase signals (x volts) could be the "phase a" signal and the other one (y volts) could be the difference between the "phase b" and "phase c" signals scaled down by sqrt(3)/2 so that both the two phase signals have the same amplitude. Therefore x volts=a volts and y volts=(b volts−c volts)*2/sqrt(3) and the x and y signals are sine waves of equal magnitude and separated by 90 degrees. For example, x=p sin (w$_1$t) and y=p sin (w$_1$t−90) where p is the amplitude, w$_1$ is the frequency of the motor or the phase signal.

To determine the magnitude and frequency of this signal another set of two-phase signals is generated by frequency generator module 128. The outputs 130 are sine (u$_s$) and cosine (u$_c$) signals such that u$_s$=sin (w$_2$t+δ) and u$_c$=cos(w$_2$t+6) where w$_2$ is the calculated frequency signal 124 and δ is the phase angle between the signals 106 and 130. An error signal 110 is generated by module 108 using the relation ship error=x*u$_s$+y*u$_c$=p sin (w$_1$−w$_2$−δ). This error signal is used by the regulator 112 to produce a frequency indication 114. This frequency is limited by the limiter 116 to generate the frequency w$_2$ signal 124. The regulator configures the frequency 124 to drive the error signal 110 to zero. When the error signal 110 is zero, then the frequencies w$_1$ and w$_2$ are the same and the angle δ is zero. Therefore, the signal 124 indicates the frequency of the motor voltage.

Reference speed and tolerance module 120 generates the limits based on other available speed indicators 122. This includes speed information from other axles, sensors, systems, and the like. A tolerance can be applied based on expected variations due to various factors like wheel slip, wheel diameter differences and other dynamics. This could also be used to initialize the value of frequency signal 124. A magnitude signal 134 is generated by module 132 using the relationship signal magnitude=$x*u_s+y*u_c$=p cos($w_1-w_2-\delta$). So at steady state when $w_1=w_2$ and $\delta=0$, the magnitude=p which is the magnitude of the motor signal voltage. If this condition is not satisfied the magnitude signal (cosine signal) has an average value of zero. Therefore, at steady state both frequency and amplitude of the signal can be calculated. As the motor speed changes, the value of $w_1$ changes and the regulator 112 drives $w_2$ to $w_1$. Therefore, if there is a steady magnitude with a minimum amplitude, then the frequency output indicates the motor speed. This speed indication can be used to determine when the speed indication is zero and thus detect locked axle conditions as well. It will be appreciated that there are other suitable techniques of generating phase locked loop control. For example, a single frequency could be used instead of a two-phase signal.

Figure 4:
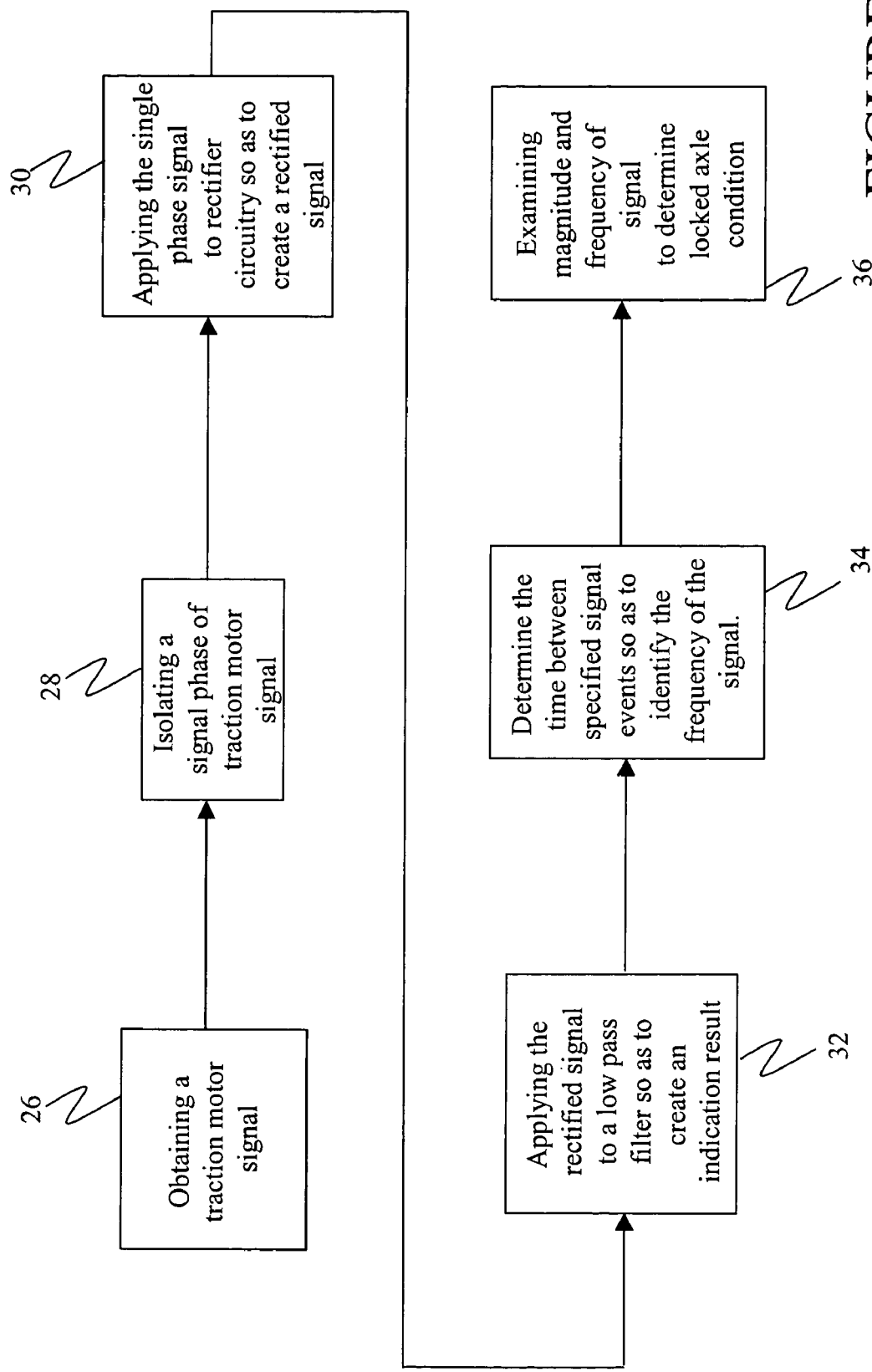
FIG. 4 is a flow diagram describing a second embodiment of a method for detecting a locked axle condition in a vehicle in accordance with an exemplary embodiment.

Referring to FIG. 4, a second embodiment is discussed. In accordance with a second embodiment, a traction motor signal is obtained as in step 26 and a single phase of the traction motor signal is isolated as in step 28. This phase is then applied to a signal rectifier so as to create a rectified signal as in step 30. This rectified signal is then applied to a low pass filter so as to create an indication result responsive to the magnitude of the rectified signal as in step 32. In addition, the traction motor signal is examined to determine the time between predetermined specified signal events (i.e. zero crossings, peak-to-peak). This allows for the creation of an indication result responsive to the frequency of the traction motor data signal as in step 34. The indication result responsive to the magnitude of the rectified signal and the indication result responsive to the frequency of the traction motor signal are then examined to determine if a locked axle condition exists, as in step 36.

In accordance with an exemplary embodiment, the rectifier may be any rectifying device, method or circuitry known in the art and suitable to the desired end purpose. In addition, low pass filter may be any low pass filtering device, method or circuitry known in the art and suitable to the desired end purpose.

FIG. 4a shows the details of one form of this embodiment. Signal 202 is one of the phase voltages from the traction motor (for example phase a). This signal is rectified at rectifier 204. The output, depicted in graph 206, of this rectifier is sent through a low pass filter 208 to get the steady magnitude 210 of the motor voltage. The same input signal 202 is processed in step 212 to establish time stamps associated with the specific aspects of the phase voltage waveform. For example, t1 and t4 are the zero crossing times when the signal goes from a negative value to positive value. Module 214 calculates the frequency of the motor signal 216 using the relationship frequency=1/(t4-t1). Other suitable time points could be used to determine the frequency also. For example, time between two consecutive zero crossings, or time between peak values or time when the signal crosses the same value etc. Other limiting conditions can be applied as discussed before, such as, the magnitude should have a minimum, steady value or the frequency should be within limits of other known speed signals. A further improvement may be realized by filtering the input signal using a low pass filter or integrator (not shown) to block the high frequency noise signals present in signal 202.

It is considered within the scope of an exemplary embodiment that the magnitude and/or frequency of the back EMF signal may be determined using a single phase or multiple phases of the back EMF signal. It is also considered within the scope of an exemplary embodiment that all three phases of the back EMF signal may be used independently to determine the magnitude and/or frequency of back EMF signal. In such a situation, if any one of the determined magnitude and/or frequency is different from the speed of vehicle 1, a locked axle condition may be assumed.

Figure 5:
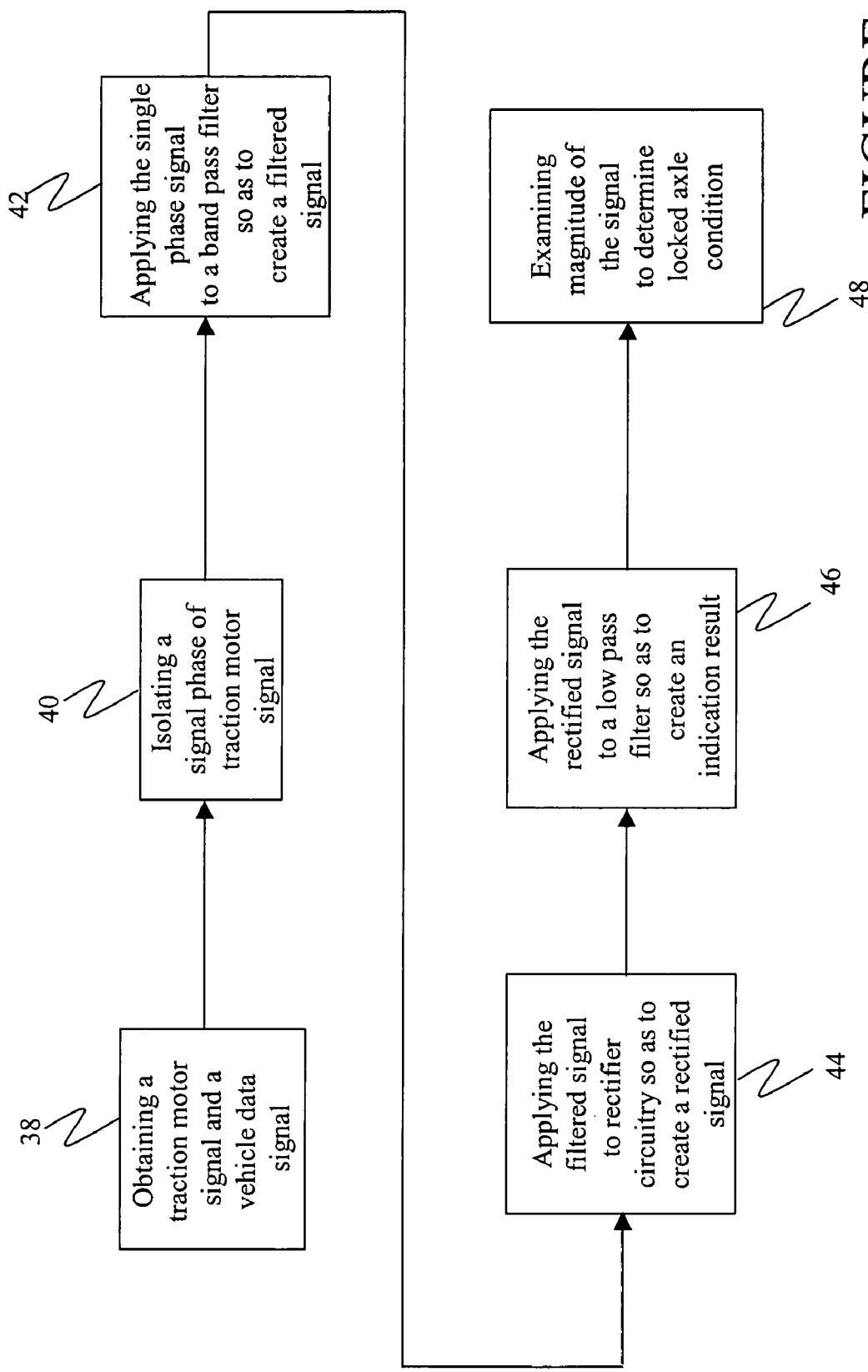
FIG. 5 is a flow diagram describing a third embodiment of a method for detecting a locked axle condition in a vehicle in accordance with an exemplary embodiment.

Referring to FIG. 5, a third embodiment is discussed. In accordance with a third embodiment, a traction motor signal and at least one vehicle data signal are obtained as in step 38. A single phase of the traction motor signal is then isolated as in step 40 and applied to a band pass filter so as to create a filtered signal responsive to the frequency of the vehicle data signals, as in step 42. In accordance with an exemplary embodiment, the parameters of the band pass filter are preferably responsive to the vehicle data signals. This allows only the expected frequency components, as established by the vehicle data signals, of the traction motor signal to be communicated into the filtered signal.

The filtered signal is then applied to a rectifier so as to create a rectified signal as in step 44 and the rectified signal is applied to a low pass filter to create an indication result further responsive to the magnitude of the rectified signal as shown in step 46. The magnitude of the indication result is then examined to determine if a locked axle condition exists as shown in step 48. In accordance with an exemplary embodiment, rectifier may be any rectifying device, method or circuitry known in the art and suitable to the desired end purpose. Furthermore, low pass filter may be any low pass filtering device, method or circuitry known in the art and suitable to the desired end purpose.

In accordance with an exemplary embodiment, vehicle data signal may include a vehicle speed signal, a reference speed signal responsive to the speed of vehicle axles and/or a reference speed tolerance. In accordance with an exemplary embodiment, band pass filter may be any band pass filtering device, method or circuitry known in the art and suitable to the desired end purpose. Also in accordance with an exemplary embodiment, the center frequency of the band pass filter is preferably responsive to the calculated, measured and/or expected speed of vehicle 1. In addition, the bandwidth of the band pass filter is preferably responsive to the frequency range expected during normal operation (i.e., non locked axle condition). Moreover, although the bandwidth and center frequency of the band pass filter is preferably adjusted via software (i.e., programmable), it is considered within the scope of the exemplary embodiment that the bandwidth and center frequency may also be adjusted via hardware or via a combination of software and hardware. It is also considered within the scope of the exemplary embodiment that the bandwidth and center frequency of the band pass filter may be dynamically adjusted in a manner responsive to the operating performance and/or condition of vehicle 1 and/or may be adjusted on a periodic basis as desired.

FIG. 5a shows the details of an implementation of the filter of FIG. 5. Signal 302, as illustrated in 304, is one of the phase voltages from the traction motor (for example "phase a" volts) and may include various harmonics. The signal 302 is sent to a band pass filter 306. The band pass filter 306 selects frequencies within a selected band, described by the bandwidth and the center frequency. The signal 308 is generated based on various inputs 310 to reference speed and tolerance module 312 which can determine the speed of the vehicle. For example, the center frequency may be the best estimate of the motor frequency and the bandwidth could be the expected tolerance of the motor frequency based on parameters like wheel diameter, wheel slip, accuracy etc. The ouput of the band pass filter represented in signal 314 shows the harmonics present in signal 302 within the band specified in signal 308. This signal 314 represents the signal indicating speed of the motor. Rectifier 316 rectifies this signal 314 to produce signal 318, which can be filtered by the low pass filter 320 to produce a signal 322, which represents the magnitude of the signal present in the motor winding in the frequency range of the expected motor speed. So, it will be appreciated that, if there is a magnitude present e.g., beyond a selected threshold, then the motor voltage contains a frequency signal in the band selected. Therefore, if the signal magnitude is sufficient then the speed of the motor is in the range of the band and the band can be made arbitrarily small. It will also be appreciated that other phases can also be used for backup or redundancy.

Figure 6:
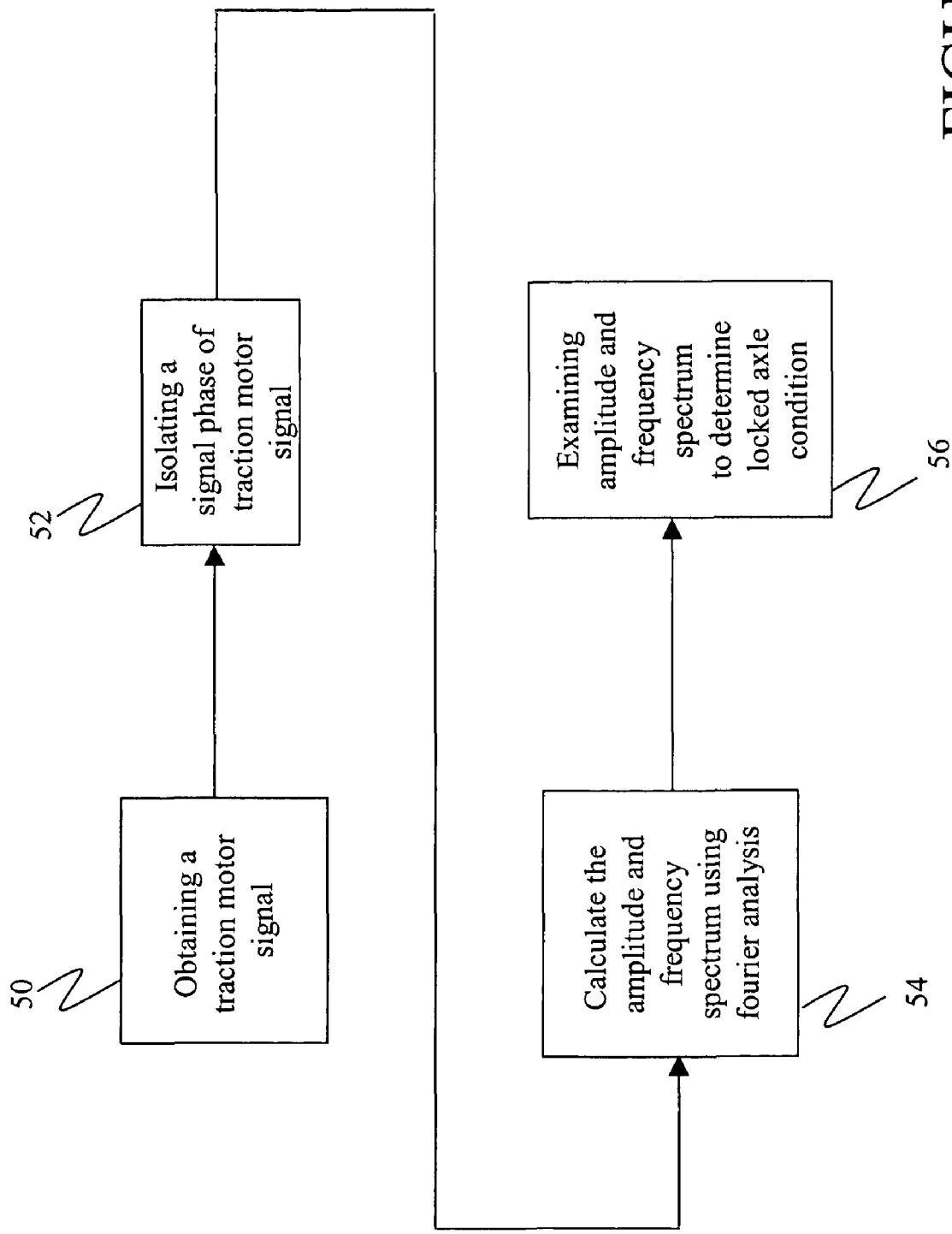
FIG. 6 is a flow diagram describing a fourth embodiment of a method for detecting a locked axle condition in a vehicle in accordance with an exemplary embodiment.

Referring to FIG. 6, a fourth embodiment is discussed. In accordance with a fourth embodiment, a traction motor signal is obtained as in step 50 and a single phase of the traction motor signal is isolated as shown in step 52. The magnitude and frequency spectrum of the single phase of the traction motor signal is then calculated using Fourier analysis as in step 54. The calculated magnitude and frequency spectrum is then examined to determine if a locked axle condition exists as in step 56.

FIG. 6a shows the illustration of the signals in the FIG. 6 embodiment. Signal 402 is one of the phase voltages from the traction motor (for example "phase a" volts). This signal as illustrated in graph 404 can contain many harmonics. This signal is passed through a Fourier/spectrum analysis circuit 406. This circuit decomposes the frequency contents in the input waveform. The output of this block contains the magnitude/frequency spectrum 408 as illustrated in graph 410. The spectrum shows the amplitude of each of the frequencies. The y-axis represents the amplitude and the x-axis represents the frequency. The highest magnitude content represents the speed. All other frequencies should be relatively small in amplitude. There should be a substantially steady magnitude of a given frequency. The other phases can be used for confirmation/redundancy/backup.

In accordance with an exemplary embodiment, the signal rectifier is preferably a full wave rectifier. However, it is considered within the scope of an exemplary embodiment that any rectifying device(s), circuit or method available and suitable to the desired end purpose may be used.

Processing of FIG. 2 may be implemented through central controller 6 operating in response to a computer program. In order to perform the prescribed functions and desired processing, as well as the computations therefore (e.g., the execution of Fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include signal input signal filtering to enable accurate sampling and conversion or acquisitions of such signals from communications interfaces. It is also considered within the scope of an exemplary embodiment that the processing of FIG. 2 may be implemented by a controller located remotely from central controller 6.

As described above, the present invention can be embodied in the form of computer-implemented processes and apparatuses for practicing those processes. The present invention can also be embodied in the form of computer program code containing instructions embodied in tangible media 8, such as floppy diskettes, CD-ROMs, hard drives, or any other computer-readable storage medium 8, wherein, when the computer program code is loaded into and executed by a computer, the computer becomes an apparatus for practicing the invention. Existing vehicles having reprogrammable storage (e.g., flash memory) can be updated to implement the invention. The present invention can also be embodied in the form of computer program code, for example, whether stored in a storage medium 8, loaded into and/or executed by a computer, or transmitted as a signal 9 over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of an exemplary embodiment. In addition, many modifications may be made to adapt a particular situation or material to the teachings of an exemplary embodiment without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting a rotational velocity of a traction motor in a vehicle comprising:
   obtaining a traction motor signal having at least one phase, wherein said traction motor signal is responsive to an operating condition of said traction motor wherein said traction motor is electrically unexcited;
   processing said traction motor signal to create an indication result based on a frequency of said traction motor signal; and
   determining rotational velocity of said traction motor based on said indication result;
   wherein said vehicle includes an additional traction motor.

2. The method of claim 1, further comprising obtaining a vehicle data signal.

3. The method of claim 2, wherein said vehicle data signal includes reference speed signal responsive to a rotational velocity of said additional traction motor.

4. The method of claim 3, wherein said vehicle data signal includes a reference speed tolerance.

5. The method of claim 2, wherein said processing said traction motor signal includes proceeding with said processing responsive to said vehicle data signal.

6. The method of claim 1, further comprising converting said traction motor signal into a two-phase signal responsive to said traction motor signal.

7. The method of claim 6, wherein said processing includes applying said two-phase signal to phase locked loop (PLL) circuitry so as to create a PLL signal responsive to the frequency of said two-phase signal.

8. The method of claim 7, wherein said processing further includes processing said PLL signal so as to create a two-phase unity signal responsive to the frequency of said PLL signal.

9. The method of claim 8, wherein said processing further includes combining said unity signal and said two-phase signal so as to create said indication result.

10. The method of claim 8, wherein said determining includes comparing said unity signal with said two-phase signal so as to determine the frequency error of said two-phase signal.

11. The method of claim 8, wherein said indication result is responsive to the frequency of said unity signal.

12. The method of claim 6, wherein said indication result is responsive to the frequency of said two-phase signal.

13. The method of claim 6, wherein said processing said traction motor signal includes determining the magnitude of said two-phase signal.

14. The method of claim 13, wherein said processing includes creating said indication result wherein said indication result is responsive to the magnitude of said two-phase signal.

15. The method of claim 1, wherein processing said traction motor signal includes isolating a single phase of said traction motor signal.

16. The method of claim 15, wherein processing said traction motor signal includes applying said single phase of said traction motor signal to a rectifier so as to create a rectified signal.

17. The method of claim 16, wherein processing said traction motor signal includes applying said rectified signal to a low pass filter so as to create an indication result responsive to the magnitude of said single phase of said traction motor signal.

18. The method of claim 15, wherein processing said traction motor signal includes processing said single phase of said traction motor signal so as to create said indication result responsive to the magnitude of said single phase of said traction motor signal.

19. The method of claim 15, wherein processing said traction motor signal includes determining the time between predefined signal event occurrences so as to create an indication result responsive to the frequency of said signal phase of said traction motor signal.

20. The method of claim 1, wherein processing said traction motor signal includes processing said traction motor signal so as to create said indication result responsive to the frequency of said traction motor signal.

21. The method of claim 15, wherein said processing said traction motor signal includes calculating said indication result using fourier analysis, wherein said indication result is responsive to the magnitude and frequency spectrum of said traction motor signal.

22. The method of claim 15, wherein said processing said traction motor signal includes obtaining a vehicle data signal and applying said single phase of said traction motor signal to a band pass filter so as to create a band pass output signal responsive to said vehicle data signal.

23. The method of claim 22, wherein said processing said traction motor signal includes applying said band pass output signal to a signal rectifier so as to create a rectified signal.

24. The method of claim 23, wherein said processing said traction motor signal includes applying said rectified signal to a low pass filter so as to create said indication result wherein said indication result is responsive to the magnitude and frequency of said single phase of said traction motor signal.

25. The method of claim 1 wherein said rotational velocity of said traction motor is indicative of a velocity of said vehicle.

26. The method of claim 1 wherein said traction motor is connected to an axle of said vehicle and the method further comprises determining if a locked axle condition exists.

27. The method of claim 1, further comprising determining at least one of: determination of speed of said vehicle, vehicle adhesion control, vehicle speed control, and wheel diameter determination based on said indication result.

28. The method of claim 1 wherein said traction motor signal is based on a voltage generated by a residual flux in said traction motor when rotated by movement of said vehicle.

29. A data storage medium including instructions encoded in a computer readable form for causing a computer to implement a process for detecting a rotational velocity of a traction motor in a vehicle comprising:
    obtaining a traction motor signal having at least one phase, wherein said traction motor signal is responsive to an operating condition of said traction motor wherein said traction motor is electrically unexcited;
    processing said traction motor signal to create an indication result responsive to a frequency of said traction motor signal; and
    determining rotational velocity of said traction motor based on said indication result;
    wherein said vehicle includes an additional traction motor.

30. A computer data signal encoded in a computer readable medium, said data signal comprising code configured to direct a computer to implement a process for detecting a rotational velocity of a traction motor in a vehicle comprising:
    obtaining a traction motor signal having at least one phase, wherein said traction motor signal is responsive to an operating condition of said traction motor wherein said traction motor is electrically unexcited;
    processing said traction motor signal to create an indication result responsive to a frequency of said traction motor signal; and
    determining rotational velocity of said traction motor based on said indication result;
    wherein said vehicle includes as additional traction motor.

31. A computer processor on a vehicle for performing a process for detecting a rotational velocity of a traction motor in a vehicle comprising:
    obtaining a traction motor signal having at least one phase, wherein said traction motor signal is responsive to an operating condition of said traction motor wherein said traction motor is electrically unexcited;
    processing said traction motor signal to create an indication result responsive to a frequency of said traction motor signal; and
    determining rotational velocity of said traction motor based on said indication result;
    wherein said vehicle includes an additional traction motor.

32. A system for detecting a rotational velocity of a traction motor in a vehicle comprising:
    a traction motor generating a traction motor signal having at least one phase, wherein said traction motor signal is responsive to an operating condition of said traction motor wherein said traction motor is electrically unexcited;
    a voltage sensor configured to generate a signal indicative a voltage generated by residual flux in said traction motor when rotated by movement of said vehicle with said traction motor in an electrically unexcited state; and
    a controller in operable communication with at least one of said traction motor and said voltage sensor configured to process said traction motor signal and said signal, and thereby create an indication result responsive to a frequency of said traction motor signal and indicative of rotational velocity of said traction motor.

* * * * *